United States Patent
Xiong et al.

(10) Patent No.: US 8,762,325 B2
(45) Date of Patent: Jun. 24, 2014

(54) PROCESSING OF FILES FOR ELECTRONIC CONTENT MANAGEMENT

(75) Inventors: Yuqian Xiong, Fremont, CA (US); Prateek Kathpal, San Jose, CA (US); George Zhendong Gao, Fremont, CA (US)

(73) Assignee: Foxit Corporation, Fremont, CA (US)

( * ) Notice: Subject to any disclaimer, the term of this patent is extended or adjusted under 35 U.S.C. 154(b) by 374 days.

(21) Appl. No.: 12/566,351

(22) Filed: Sep. 24, 2009

(65) Prior Publication Data

US 2010/0241651 A1  Sep. 23, 2010

Related U.S. Application Data

(60) Provisional application No. 61/103,109, filed on Oct. 6, 2008.

(51) Int. Cl.
*G06F 7/00* (2006.01)

(52) U.S. Cl.
USPC .......................................................... 707/609

(58) Field of Classification Search
USPC .................. 707/687, 705, 706, 609, 999.102, 707/999.101
See application file for complete search history.

(56) References Cited

U.S. PATENT DOCUMENTS

| | | | |
|---|---|---|---|
| 7,506,003 B2* | 3/2009 | Robert et al. ........................ 1/1 |
| 7,506,005 B2* | 3/2009 | Havewala et al. .................... 1/1 |
| 7,873,681 B2* | 1/2011 | Suriyanarayanan et al. . 707/822 |
| 8,423,565 B2* | 4/2013 | Redlich et al. ................ 707/758 |
| 2004/0181753 A1* | 9/2004 | Michaelides ................. 715/523 |
| 2006/0041840 A1* | 2/2006 | Blair et al. .................... 715/513 |
| 2006/0080289 A1* | 4/2006 | Brunswig et al. ................. 707/3 |
| 2006/0259461 A1* | 11/2006 | Kapur ............................... 707/2 |
| 2006/0259524 A1* | 11/2006 | Horton ......................... 707/201 |
| 2007/0016618 A1* | 1/2007 | Robert et al. ................. 707/200 |
| 2007/0016619 A1* | 1/2007 | Suriyanarayanan et al. . 707/200 |
| 2007/0016621 A1* | 1/2007 | Havewala et al. ............ 707/200 |
| 2008/0028009 A1* | 1/2008 | Ngo ............................. 707/204 |
| 2008/0033969 A1* | 2/2008 | Koo et al. .................... 707/100 |
| 2008/0154873 A1* | 6/2008 | Redlich et al. .................... 707/5 |
| 2008/0162592 A1* | 7/2008 | Huang et al. ................. 707/202 |
| 2008/0313146 A1* | 12/2008 | Wong et al. ..................... 707/3 |
| 2009/0327002 A1* | 12/2009 | Chapman et al. ................ 705/7 |
| 2010/0010968 A1* | 1/2010 | Redlich et al. .................... 707/3 |

* cited by examiner

*Primary Examiner* — Hosain Alam
*Assistant Examiner* — Eliyah S Harper
(74) *Attorney, Agent, or Firm* — James Cai; Schein & Cai LLP

(57) ABSTRACT

A file is received by for online storage and processing. Prior to storing, the file is bifurcated into content data and metadata for separate processing. The content data from uploaded files can be converted from a native format to a common format, and stored in a data store. The metadata from uploaded files can be stored in a database. When a request for the file is received, the file can be reassembled in the native format by converting the data content back to the native format and appending the metadata.

3 Claims, 4 Drawing Sheets

PROCESSING OF FILES FOR ELECTRONIC CONTENT MANAGEMENT

CROSS-REFERENCE TO RELATED APPLICATIONS

This patent application claims priority under 35 U.S.C. 119(e) to U.S. Provisional Patent application No. 61/103,109 filed Oct. 6, 2008 by Prateek Kathpal, George Zhendong Gao and Yuqian Xiong, the entire contents of which are herein incorporated by reference.

FIELD OF THE INVENTION

The present invention relates generally, to electronic content management, and more specifically, to bifurcating content data of a file from metadata related to the file for separate processing.

BACKGROUND OF THE INVENTION

Online document storage systems allow users and entities to have universal access to documents and other types of files. Rather than storing a document locally, a user can log on to the system and upload and download documents from a web browser at any computer. In another example, one user from an entity can create an upload a document, while a different user accesses the same document to make edits, without the need to send the document back and forth to each other.

One problem with these systems is that there are so many different types of file formats available to users. Consequentially, back end processing of uploaded files can require that they system have compatibility with each of the file formats. Alternatively, uploading may be limited to file formats for which the system has compatibility. On the other hand, leaving files in their native formats provides varying levels of security, wasted storage space from uncompressed data, and other issues.

Another problem is that the huge amount of data stored on the systems make access to specific documents complex. Unless a user indicates the name or location of a document, searching capabilities are limited and slow. For example, a wild card search for a file may require the system to laboriously sort through many large video files for many users to find a desired file.

Therefore, there is a need for a method and system for electronic content management that provides more robust back end processing.

SUMMARY OF THE INVENTION

The present invention provides methods, systems, and computer products that meet the above needs. In one embodiment, a method for content management receives a file, and bifurcates the file into content data and metadata for separate processing. The content data from uploaded files can be converted from a native format to a common format, and stored in a data store. The metadata from uploaded files can be stored in a database. When a request for the file is received, the file can be reassembled in the native format by converting the data content back to the native format and appending the metadata.

In one embodiment, the content data is processed by a back end system in the common format. The common format can provide additional features, such as security and compression, relative to native formats. Examples of common formats include PDF, PDF/A, XML, proprietary formats, and the like.

In another embodiment, the metadata is processed by the back end system from the database. Searches can be performed on the database for file retrieval and aggregated reports of files. Additional metadata can be associated with the file such as workflows and business processes. For example, a workflow defined by rules can allow documents to be automatically processed. The system uses metadata to identify a document as part of a workflow, and then operate on it.

Advantageously, the techniques disclosed herein provide more efficient back end processing for files with additional features.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF THE INVENTION

Figure 1:
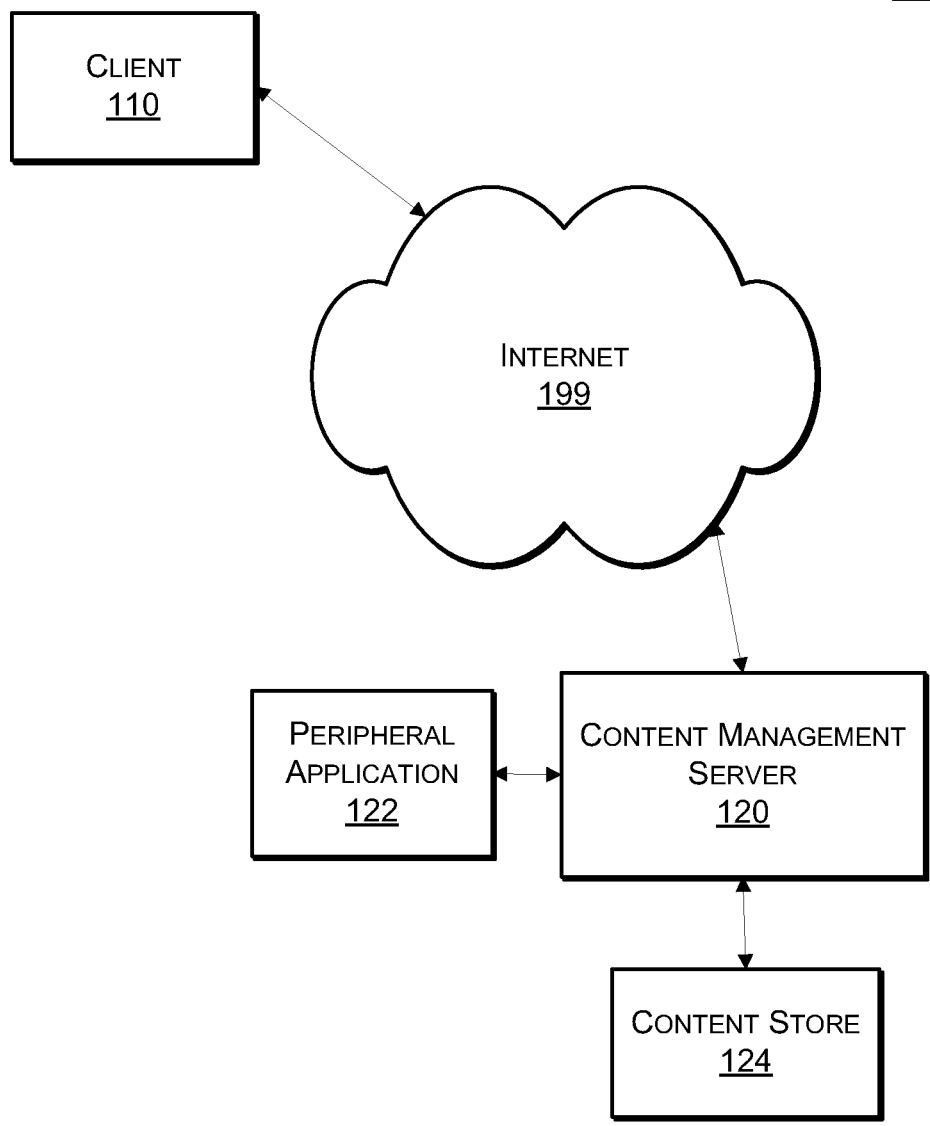
FIG. 1 is a block diagram illustrating a system for content management according to one embodiment of the present invention.

FIG. 1 is a block diagram illustrating a system 100 for content management according to one embodiment of the present invention. The system 100 comprises a client 110, a content management server 120, a peripheral application 122, and a content store 124. The client 110 and the content management server 120 can be coupled in communication through the Internet 199 as shown in FIG. 1, or alternatively by a local access network, a wide area network, or the like. The peripheral application 122 and content store 124 can preferably have a dedicated connection to the content management server 120, but can also be connected over the Internet 199. In general, the system 100 can be used by an enterprise or individual users for file management. For example, the system 100 can be used to implement workflows, archive, backup, share files, and the like The client 110 can be any device capable of connecting over a network such as a personal computer or mobile device. The client 110 includes software for structured file creation and modification, such as spreadsheet, word processing, multimedia, and database applications. The client 110 can also generate unstructured data. In some embodiments, peripheral hardware such as a scanner or a facsimile creates files. In operation, the client 110 accesses the content management server 120 using a custom application or a general application such as a web browser (e.g., Internet Explorer) as a user interface. The user interface can permit uploading, downloading, editing, and other management functions.

The content management server 120 can be a personal computer or server blade with a software module. In general, the content management server 120 bifurcates files received from the client 110 or the peripheral application 120 into content data and metadata. In addition, the content management server 120 can process the content data separately from the metadata, according to configurations (e.g., workflows or business processes). Further details about the content management server 120 are discussed below.

The peripheral application 122 can be an external device or application such as a main frame computer, a scanner, a facsimile machine, a telephone, a database, or the like. In one embodiment, the peripheral application 122 uses a programmable interface to interact with the content management server 120. The peripheral application 122 can send transactional data from a main frame computer.

The content store 124 includes a database for storing the bifurcated data and a file system.

The embodiment of FIG. 1 is merely an exemplary configuration of the system 100, as many variations are possible. For example, there can be multiple clients or multiple content management servers.

Figure 2:
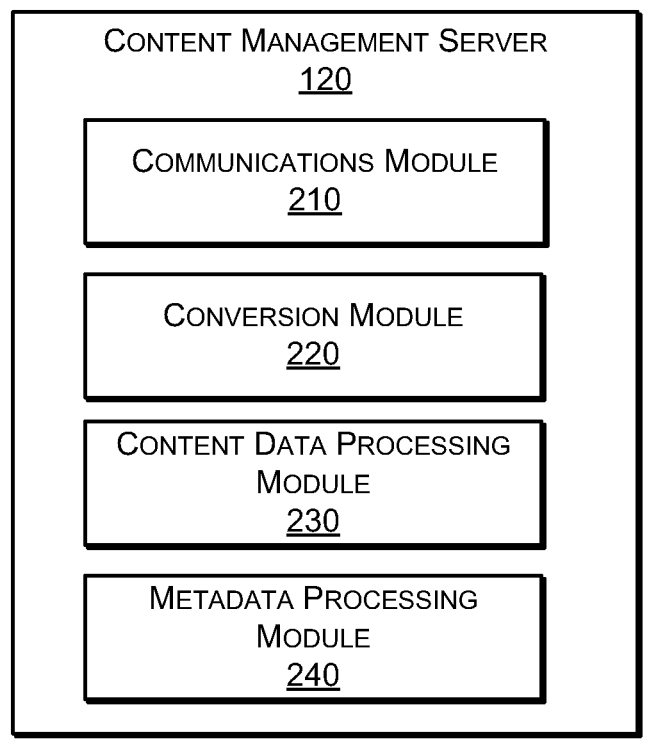
FIG. 2 is a block diagram illustrating a content management server of the system in FIG. 1 according to one embodiment of the present invention.

FIG. 2 is a block diagram illustrating the content management server 120 of the system 100 in FIG. 1 according to one embodiment of the present invention. The content management server 120 includes a communications module 210, a conversion module 210, a content data processing module 230, and a metadata data processing module 240.

The communications module 210 provides communication ports and interfaces for receiving and sending files. In one embodiment, the communications module 210 registers and authorizes devices and users. To do so, the communications module 210 can receive authentication information such as a cookie, password, or the like.

The conversion module 220 changes content data of a file from a first format to a second format. The first format can be any structured data format created by spreadsheet (e.g., XLS), word processor (e.g., DOC), multimedia (e.g., MPG4), database, or other applications. Additionally, the first format can be unstructured data such as transactions or textual data. In one embodiment, each of the files is converted to the same second format, such as PDF, PDF/A, XML, or a proprietary format. In turn, content data can be efficiently processed on the back end, without the need for compatibility with each of the native formats.

Furthermore, the conversion module 220 reassembles the file upon request on demand (e.g., downloading or editing) by converting the content data from a second file format back to a first file format. The metadata is also appended to the content data prior to sending the file.

The content data processing module 230 performs further processing on the content data of a file without obstructing access to the corresponding metadata. In one embodiment, the content data can be compressed. In another embodiment, security such as encryption can be added to the content data. The content data processing module 230 can also handle file management of the content data in a data store.

The metadata processing module 240 operates on the metadata independent of the content data. For example, a workflow with rules for distribution of incoming files can process incoming files based on the metadata. In another example, a database of searchable records can provide an entity with an index to archived documents.

Figure 3:
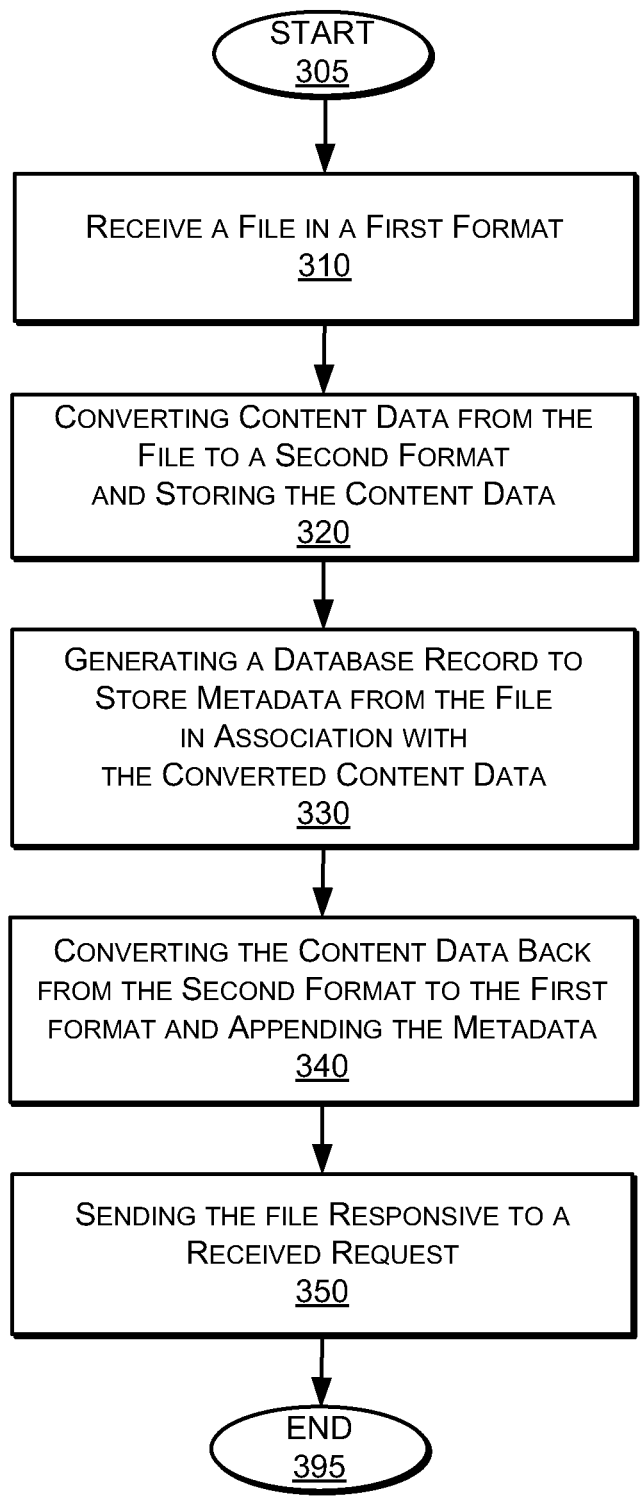
FIG. 3 is a flow chart illustrating a method for content management according to one embodiment of the present invention.

FIG. 3 is a flow chart illustrating a method 300 for content management according to one embodiment of the present invention. The method 300 can be implemented, for example, in the system 100 of FIG. 1.

In a first data path, a file is received 310 in a first format. Next, the file is bifurcated for separate processing. Content data from the file is converted 320 from a first format to a second format, and then stored. A database record is generated 330 to store metadata from the file. The database record can include fields such as a link to content data, file name, first format of file, file size, file creator, version number, link to workflow, audit status, and the like.

Once stored, the content data and the metadata of a file can be separately processed. The metadata in a database record can be updated separately from the content data. On the other hand, the content can be aggregated, secured, compressed, edited or otherwise operated on. An example of metadata processing is discussed in detail below with respect to FIG. 4.

In a second data path, a content data is converted 340 back from the second format to the first format. In one embodiment, a database accessed to identify the first format. The associated metadata can also be identified for appending with the content data to complete the file. The file is then sent 350 responsive to the received request in its original format.

In one example, the file is converted back for remote editing. An authorized user edits the document in its native format through a browser or the native application. Once the edits have been completed, an updated file is bifurcated and new content data and new metadata are stored according to the method 300.

Figure 4:
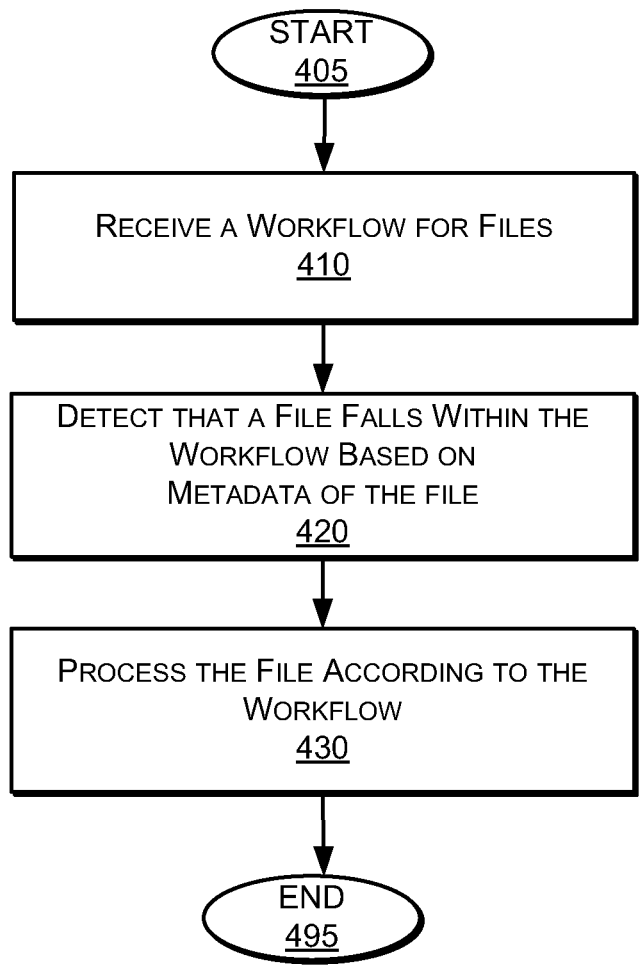
FIG. 4 is a flow chart illustrating a method for processing metadata generated in the method of FIG. 3 according to one embodiment of the present invention.

FIG. 4 is a flow chart illustrating a method 400 for processing metadata generated in the method 300 of FIG. 3 according to one embodiment of the present invention.

A workflow for files is received 410. The workflow can be created, for example, by a user through a user interface. The workflow can be defined by a set of rules configured by a user. A file that falls within the workflow is identified 420 based on metadata extracted from a received file. The file is then processed 430 according to the workflow rules.

In one implementation, a workflow is configured for incoming e-mails from a customer. Each e-mail is routed to a department based on a subject line, and also routed to a customer representative based on who sent the e-mail. As such, the metadata is extracted and stored in the method 300 of FIG. 3. During batch processing at a certain time, a database is queried for updates. The query returns an instance of the database record for the subject field and an instance for the from field. A link to the secured e-mail content is sent to the appropriate department and to the customer representative. The link is clicked, and a user is authorized to view the e-mail content.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, Therefore, the scope of the appended claims should be accorded the broadest interpretation so as to encompass all such modifications and similar arrangements.

The invention claimed is:
1. A method for electronic content management, the method comprising:
 accepting a diversity of document files from one of a client and a peripheral application, each document file in a respective and different native format for processing by a back end server, wherein each of the native format document files comprise content data and metadata;

bifurcating each accepted native format document file into its constituent content data and metadata components;

storing the bifurcated content data files in a data store for processing and later reconstitution;

storing the bifurcated metadata component of each bifurcated document file in a database;

receiving a workflow for document files at the back end server, identifying whether the document files fall within the workflow based on the respective metadata components stored in the database, and processing the identified document files according to workflow rules;

converting the bifurcated content data files in their respective native formats into a single common format and processing all the content data files in a single common format, by the back end server;

configuring the metadata of each document file to perform searches on the database for retrieving corresponding processed content data files and generating an aggregated report of files;

converting content data files processed in the common format back into their original native formats and reconstituting the document files by combining the processed content data files with their original metadata components; and supplying processed document files in their native formats to requestors on demand.

2. A computer implemented system for content management, said computer implemented system comprising:

a computer system comprising one or more processors, said computer system configured to store one of a plurality of different document files, said computer system communicatively coupled with one or more of a plurality of devices, said computer system further configured to provide access to said stored files by said one or more devices, said computer system accepting a diversity of document files in a respective and different native format from one of a client and a peripheral application, said computer system bifurcating each accepted native format document file into its constituent content data and metadata components, said computer system further comprising:

a communications module comprising ports and interfaces configured to send and receive said different document files in their respective native formats each comprising content data and metadata related to the document file, and further configured to register and authorize said one or more devices and users with authentication information it receives;

a conversion module configured to convert content data in each type of native format document file into a single common format and to store the bifurcated content data file in a data store for processing and later reconstitution;

said conversion module further configured to store bifurcated metadata component of each native format document file in a database;

a content data processing module configured to process content data independent of the corresponding metadata, and for file management of the content data in the datastore;

a metadata processing module in the back end system configured to operate on metadata independent of content data, and for file management of the metadata in the database;

said metadata processing module further configured to perform searches on the database for file retrieval and aggregated reporting of files;

said metadata processing module further configured to associate metadata with any file workflows defined by a set of predetermined rules, thereby allowing documents to be automatically processed;

said metadata processing module further configured to operate on the metadata independently of the content data for content management; and said metadata processing module further configured to receive the workflow for document files, detect that a document file falls within the workflow based on the metadata of the document file, and to process the document file according to the workflow.

3. The system of claim 2, wherein the conversion module is further configured to be responsive to requests for document files and responds by converting processed content data files in the database from common format to native format, reconstituting the document files in native format by combining the content data files in native format with their corresponding metadata, and sending the results back to the requestor.

* * * * *